United States Patent Office 3,012,027
Patented Dec. 5, 1961

---

3,012,027
21-ACETOXY-11β,12β-EPOXY-5α-PREGNAN-3,20-DIONE AND PROCESS
Henry A. Walens, Philadelphia, and Monroe E. Wall, Oreland, Pa., assignors to The United States of America as represented by the Secretary of Agriculture
No Drawing. Filed Nov. 13, 1958, Ser. No. 773,799
7 Claims. (Cl. 260—239.55)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

The present invention relates to steroid compounds, particularly relating to 21-acetoxy-11β,12β-epoxy-5α-pregnan-3,20-dione, to the intermediates fromed in its preparation from 11β,12β-epoxy-tigogenin acetate, and to the processes by which these compounds are obtained.

The compound 21-acetoxy-11β,12β-epoxy-5α-pregnan-3,20-dione is an intermediate in the production of useful corticoid hormones. For example, treatment with hydrobromic acid, followed by oxidation and palladium reduction gives 21-acetoxy-5α-pregnan-3,11,20-trione. Bromination of the latter gives 2,4-dibromo-21-acetoxy-5α-pregnan-3,11,20-trione which on treatment with sodium iodide and chromous chloride reduction gives 21-acetoxy-4-pregnen-3,11,20-trione, more commonly known as dehydrocorticosterone, a useful cortical hormone. Alternatively, 21-acetoxy-11β,12β-epoxy-5α-pregnan-3,20-dione may be brominated, treated with sodium iodide and reduced with chromous chloride to give 21-acetoxy-11β,12β-epoxy-4-pregnen-3,20-dione which on treatment with hydrogen fluoride gives 21-acetoxy-11β-hydroxy-12α-fluoro-4-pregnen-3,20-dione, a highly potent corticoid hormone.

An object of this invention is to provide a process for making the pregnane derivative, 21-acetoxy-11β,12β-epoxy-5α-pregnan-3,20-dione, useful as a precursor for making physiologically active compounds. Another object is to provide a process for proceeding from 11β,12β-epoxy-tigogenin acetate to the pregnane product retaining the epoxy function or a means of reforming it. A further object is to provide a process for utilizing hecogenin, a plant product. Other objects and a fuller understanding of the invention may be had by referring to the accompanying description, diagrams and claims.

The starting material, 11β,12β-epoxy-tigogenin acetate, was prepared from hecogenin. Hecogenin was acetylated and brominated, and the resulting 11α,23-dibromo-hecogenin acetate was reduced, as with sodium borohydride in appropriate solvent, to 11α,23-dibromo-12-hydroxy-hecogenin acetate. Dehydrobromination with strong alkali in alcoholic solution formed the 11β,12β-epoxy function and debromination of this intermediate by heating in an aqueous alcoholic solution containing copper sulfate and metallic zinc gave 11β,12β-epoxy tigogenin, which upon standing at room temperature in acetic anhydride-pyridine solution formed the 3-acetoxy derivative, 11β,12β-epoxy-tigogenin acetate.

The preparation of 21-acetoxy-11β,12β-epoxy-5α-pregnan-3,20-dione from 11β,12β-epoxy-tigogenin acetate will now be described with reference to the accompanying diagrams.

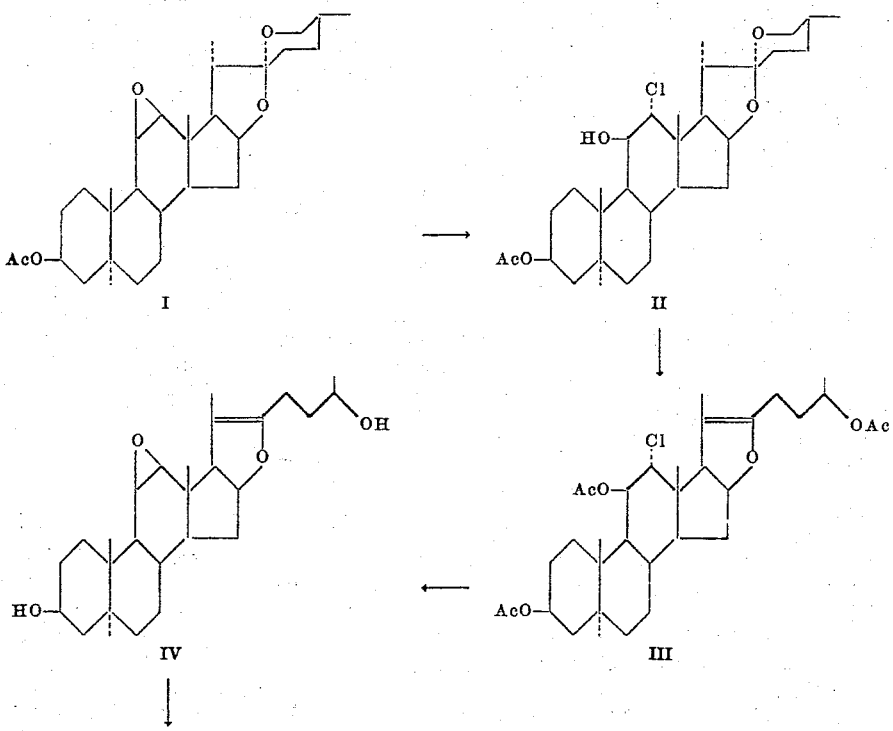

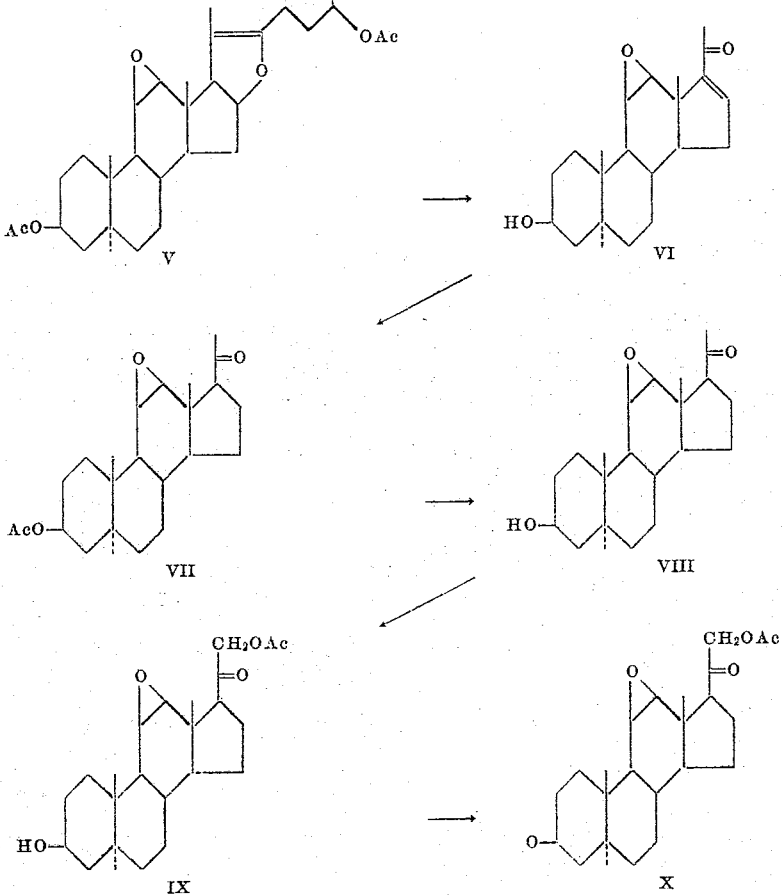

In accordance with the present invention 21-acetoxy-11β,12β-epoxy-5α-pregnan-3,20-dione is prepared by the following series of reactions: reacting 11β,12β-epoxy tigogenin acetate (I) with dilute aqueous hydrochloric acid to produce the chlorohydrin, 12α-chloro-11β-hydroxy-tigogenin acetate (II), heating II in acetic anhydride to open the F ring and form 11β-acetoxy-12α-chloro-pseudotigogenin diacetate (III), dehydrochlorinating III in alcoholic, strong alkali solution to produce 11β,12β-epoxy-pseudotigogenin (IV), acetylating IV in acetic anhydride-pyridine to give the diacetate (V), subjecting the pseudosapogenin diacetate (V) to oxidative cleavage, as obtained with chromium trioxide in cold, aqueous acetic acid, followed by alkaline hydrolysis such as potassium hydroxide in tertiary butanol to produce 11β,12β-epoxy - 3β - hydroxy-5α-pregn-16-en-20-one, and acetylating the latter to obtain the 3β-acetoxy derivative (VI), hydrogenating VI, as in the presence of the catalyst, 10% palladium on alumina, to produce 3β-acetoxy-11β,12β-epoxy-5α-pregnan-20-one (VII), heating VII in aqueous alkali solution such as potassium hydroxide in acetone and water to remove the 3β-acetoxy group and give VIII, iodinating the 11β,12β-epoxy-3β-hydroxy-5α-pregnan-20-one (VIII) with iodine and calcium oxide in tetrahydrofuran and methanol to give 11β,12β-epoxy-3β-hydroxy-21-iodo-5α-pregnan-20-one and heating the iodo derivative with potassium acetate in acetone to form 21-acetoxy-11β,12β-epoxy - 3β - hydroxy-5α-pregnan-20-one (IX) oxidizing IX with chromium trioxide in acetone in the presence of sulfuric acid and isolating the oxidation product, 21 - acetoxy - 11β,12β - epoxy-5α-pregnan-3,20-dione (X).

Compound I, 11β,12β-epoxy-tigogenin acetate, and compound VI, 3β-acetoxy-11β,12β-epoxy-5α-pregn-16-en-20-one, differ only in that the former has the sapogenin structure and the latter represents the respective 16-pregnene. Since immediate treatment of I with reagents to produce the pseudosapogenin would irreversibly alter the epoxide function, it was necessary to first change the 11β,12β-epoxide function to the 11β-hydroxy-12α-chloro-functions.

It is interesting to note that heating 12α-chloro-11β-hydroxy-tigogenin acetate (II) at 170° C. in acetic anhydride containing 1% acetic acid resulted in acylation of the 11β-hydroxy group as well as the 3β- and 26-hydroxy functions. Acylation of the 11β-hydroxy group under these conditions is quite unexpected as ordinarily this hydroxy group is very difficult to acylate except in the presence of strong Lewis acids. Also, we were surprised to find that vigorous alkaline conditions such as potassium or sodium hydroxide in alcohol solution, preferably methanol or ethanol for ease of solution, were required to convert the 11β-acetoxy-12α-chloro-moiety to the 11β,2β-epoxide. For example, if one oxidizes compound III and then gives the product a mild saponification, 11β-acetoxy-12α-chloro-3β-hydroxy-5α-pregn-16-en-20-one is obtained rather than compound VI.

EXAMPLE 1

*Preparation of 12α-chloro-11β-hydroxy-tigogenin acetate (II)*

One gram of 11β,12β-epoxy-tigogenin acetate (I) was dissolved in 100 ml. dioxane, to this was added 20 ml. 3 N HCl and 5 ml. water, and the solution was stirred at room temperature for one hour. Seventy ml. water was added over 10 minutes with stirring, during which precipitation occurred. After standing one hour the mixture was filtered, the precipitate, 12α-chloro-11β-hydroxy-tigogenin acetate (II), washed with water, and dried. Infrared analysis showed no epoxide (875 cm.$^{-1}$) band, but acetate (1735), hydroxyl (3480) and chloride (775) bands were present.

EXAMPLE 2

*Preparation of 11β-acetoxy-12α-chloro-pseudotigogenin diacetate (III)*

Nine grams of the product of Example 1 was acetylated by heating at 170° C. for 2.5 hours in 23 ml. acetic anhydride containing a small amount (1%) of acetic acid. The acetic anhydride was removed by vacuum evaporation to yield 10.4 grams of the triacetate, 11β-acetoxy-12α-chloro-pseudotigogenin diacetate (III).

EXAMPLE 3

*Preparation of 11β,12β-epoxy-pseudotigogenin (IV)*

The product of Example 2, 10.4 grams (III) was dissolved in 500 ml. methanol, 5 grams of potassium hydroxide was added with stirring, and the solution allowed to stand 16 hours at room temperature. The solution was poured into two volumes of water and the product recovered by ether extraction. Yield: 7.4 grams of 11β,12β-epoxy-pseudotigogenin (IV). Infrared analysis showed strong band at 875 cm.$^{-1}$ (epoxide), strong hydroxyl band, and absence of F ring.

EXAMPLE 4

*Preparation of 11β,12β-epoxy-pseudotigogenin diacetate (V)*

The 7.4 grams of 11β,12β-epoxy-pseudotigogenin from Example 3 was dissolved in 20 ml. of pyridine, 15 ml. of acetic anhydride was added, and the solution allowed to stand 16 hours at room temperature. The solution was poured into four volumes of water, and the product, 9.2 grams of 11β,12β-epoxy-pseudotigogenin diacetate (V) recovered by ether extractions. Infrared characteristics were peaks at 1735 and 1250 cm.$^{-1}$ (diacetate), 1685 cm.$^{-1}$ (pseudosapogenin) and 875 cm.$^{-1}$ (oxide).

EXAMPLE 5

*Preparation of 3β-acetoxy-11β,12β-epoxy-allopregn-16-en-20-one (VI)*

Two grams of the product of Example 4 (compound V) was dissolved in 30 ml. acetic acid and cooled to about 15° C. Chromium trioxide (0.8 grams) dissolved in 15 ml. of 50% aqueous acetic acid was cooled to about 10° C. and added dropwise, with stirring, to the steroid solution over a 10 minute time interval. The oxidation mixture was allowed to warm to room temperature and stirring was continued for one hour. The mixture was poured into four volumes of water and the product recovered by ether extraction. The ether was water washed, dried, and evaporated. The residue from the ether evaporation was dissolved in 50 ml. t-butanol, one gram potassium hydroxide in 2 ml. water was added, and the mixture shaken at room temperature for three hours. The pregnene product, extracted with ether as before, was not recrystallized, but converted to the acetate by standing in acetic anhydride-pyridine solution overnight. The resinous product was purified by chromatography to give 700 mg. of 3β-acetoxy-11β,12β-epoxy-allopregn-16-en-20-one (VI), M.P. 182–184° C., $[\alpha]_D^{25} = +103.5$, $\lambda_{max.}^{MeOH}$ 238.5 (log $E$=3.95)

EXAMPLE 6

*Preparation of 3β-acetoxy-11β,12β-epoxyallopregnan-20-one (VII)*

Three grams of compound VI (as prepared in Example 5) was dissolved in 100 ml. ethyl ether and hydrogenated using 1.8 grams 10% palladium on alumina at three atmospheres hydrogen for 2.5 hours. The reaction mixture was filtered to remove the catalyst and the solution evaporated to dryness under vacuum. The solids were recrystallized to give 2.7 grams 3β-acetoxy-11β,12β-epoxyallopregnan-20-one (VII).

EXAMPLE 7

*Preparation of 3β-hydroxy-11β,12β-epoxy-5α-pregnan-20-one (VIII)*

1.0 gram of compound VII was refluxed with a solution of 5 ml. of acetone containing 0.5 gram of potassium hydroxide in 2.5 ml. of water, yielding 0.8 gram of compound VIII.

EXAMPLE 8

*Preparation of 21-acetoxy-3β-hydroxy-11β,12β-epoxy-5α-pregnan-20-one (IX)*

A solution of 0.5 gram of VIII in tetrahydrofuran and methanol was stirred with calcium oxide and iodine until the solution decolorized. The crude iodo derivative was refluxed with potassium acetate in acetone to give 0.2 gram of IX.

EXAMPLE 9

*Preparation of 21-acetoxy-11β,12β-epoxy-5α-pregnan-3,20-dione (X)*

A solution of IX in acetone was cooled and treated with chromium trioxide in acetone in the presence of sulfuric acid. After a short oxidation period the desired compound X was isolated.

We claim:

1. A process for the preparation of 21-acetoxy-11β,12β-epoxy-5α-pregnan-3,20-dione comprising reacting 11β,12β-epoxy-tigogenin acetate with dilute, aqueous hydrochloric acid to produce 12α-chloro-11β-hydroxy-tigogenin acetate, heating 12α-chloro-11β-hydroxy-tigogenin acetate to about 170° C. in acetic anhydride containing about 1% acetic acid to form 11β-acetoxy-12α-chloro-pseudotigogenin diacetate, dehydrochlorinating and deacetylating 11β-acetoxy-12α-chloro-pseudotigogenin diacetate in alcoholic, strong alkali solution to give 11β,12β-epoxy-pseudotigogenin, acetylating 11β,12β-epoxy-pseudotigogenin by allowing it to stand in acetic anhydride-pyridine solution to form 11β,12β-epoxy-pseudotigogenin diacetate, oxidizing 11β,12β-epoxy-pseudotigogenin diacetate with chromium trioxide in cold, aqueous acetic acid followed by hydrolyzing the steroid oxidation product in tertiary butanol containing potassium hydroxide to give 11β,12β-epoxy-3β-hydroxy-5α-pregn-16-en-20-one, acetylating 11β,12β-epoxy-3β-hydroxy-5α-pregn-16-en-20-one by allowing it to stand in acetic anhydride-pyridine solution to form 3-acetoxy-11β,12β-epoxy-5α-pregn-16-en-20-one, hydrogenating 3-acetoxy-11β,12β-epoxy-5α-pregn-16-en-20-one with hydrogen in the presence of 10% palladium on alumina to give 3-acetoxy-11β,12β-epoxy-5α-pregnan-20-one, heating 3-acetoxy-11β,12β-epoxy-5α-pregnan-20-one in aqueous alkali solution to obtain 11β,12β-epoxy-3β-hydroxy-5α-pregnan-20-one, iodinating 11β,12β-epoxy-3β-hydroxy-5α-pregnan-20-one with iodine and calcium oxide in tetrahydrofuran and methanol to give 11β,12β-epoxy-3β-hydroxy-21-iodo-5α-pregnan-20-one, heating this 21-iodo derivative with potassium acetate in acetone to obtain 21-acetoxy-11β,12β-epoxy-3β-hydroxy-5α-pregnan-20-one, oxidizing 21-acetoxy-11β,12β - epoxy-3β-hydroxy - 5α - pregnan-20-one with chromium trioxide in acetone in the presence of sulfuric acid and isolating the oxidation product, 21-acetoxy-11β,12β-epoxy-5α-pregnan-3,20-dione.

2. 11β-acetoxy-12α-chloro-pseudotigogenin diacetate.
3. 11β,12β-epoxy-pseudotigogenin.
4. 11β,12β-epoxy-pseudotigogenin diacetate.
5. 11β,12β-epoxy-3β-hydroxy-5α-pregn-16-en-20-one.
6. 3β-acetoxy-11β,12β-epoxy-5α-pregn-16-en-20-one.

7. 11β,12β-epoxy-3β-hydroxy-21-iodo-5α-pregnan-20-one.

References Cited in the file of this patent

UNITED STATES PATENTS

| | | |
|---|---|---|
| 2,678,932 | Buck et al. | May 18, 1954 |
| 2,819,264 | Gould et al. | Jan. 7, 1958 |
| 2,874,154 | Stork et al. | Feb. 17, 1959 |
| 2,944,052 | Julian et al. | July 5, 1960 |

OTHER REFERENCES

"JACS" vol. 78, pp. 2017–18 relied on (1956), Fried et al.